United States Patent
Taniuchi

(10) Patent No.: US 7,590,832 B2
(45) Date of Patent: Sep. 15, 2009

(54) INFORMATION PROCESSING DEVICE, COMPRESSED PROGRAM PRODUCING METHOD, AND INFORMATION PROCESSING SYSTEM

(75) Inventor: Hiroshi Taniuchi, Hyogo (JP)

(73) Assignee: Panasonic Corporation, Osaka (JP)

( * ) Notice: Subject to any disclaimer, the term of this patent is extended or adjusted under 35 U.S.C. 154(b) by 479 days.

(21) Appl. No.: 11/648,627

(22) Filed: Jan. 3, 2007

(65) Prior Publication Data
US 2007/0204133 A1      Aug. 30, 2007

(30) Foreign Application Priority Data
Feb. 24, 2006   (JP) .............................. 2006-048129

(51) Int. Cl.
   *G06F 9/30*   (2006.01)
(52) U.S. Cl. ....................... 712/300; 712/233; 712/208; 712/209; 712/213
(58) Field of Classification Search ......... 712/233–244, 712/208, 209, 213, 300
See application file for complete search history.

(56) References Cited

U.S. PATENT DOCUMENTS 5,632,024 A * 5/1997 Yajima et al. ............... 712/205
5,764,994 A * 6/1998 Craft ........................... 717/159
5,787,302 A * 7/1998 Hampapuram et al. ........ 712/24
2002/0199083 A1   12/2002 Kao et al.

FOREIGN PATENT DOCUMENTS

| JP | 6-348490 | 12/1994 |
| JP | 7-121352 | 5/1995 |
| JP | 2000-267848 | 9/2000 |
| JP | 2001-142696 | 5/2001 |

* cited by examiner

*Primary Examiner*—William M Treat
(74) *Attorney, Agent, or Firm*—McDermott Will & Emery LLP

(57) ABSTRACT

An information processing device for executing a compressed program includes: an instruction buffer; a first selector for selectively outputting one of a set of signals obtained by dividing the output from the instruction buffer; an instruction decompression section for decompressing the output from the first selector into an original instruction; a second selector for outputting the output from the instruction buffer when no compressed instruction is stored in the instruction buffer and outputting the output from the instruction decompression section otherwise; an instruction decoding section for outputting a signal indicating presence/absence of instruction branching based on a result of decoding the output from the selector; and a control section for instructing the first selector to select a predetermined one of the received signals when the signal from the instruction decoding section indicates that there is instruction branching.

8 Claims, 6 Drawing Sheets

INFORMATION PROCESSING DEVICE, COMPRESSED PROGRAM PRODUCING METHOD, AND INFORMATION PROCESSING SYSTEM

CROSS REFERENCE TO RELATED APPLICATION

This application claims priority under 35 U.S.C. §119 on patent application No. 2006-48129 filed in Japan on Feb. 24, 2006, the entire contents of which are hereby incorporated by reference.

BACKGROUND OF THE INVENTION

The present invention relates to an information processing system and, more particularly, to an information processing device for executing compressed instructions and a method for producing such a compressed program.

In some conventional information processing systems for successively executing instructions in a program stored in a memory, the instructions are compressed and stored in the memory to reduce the required memory size, in which case each compressed instruction is decompressed to its original form before being executed. Methods of compression proposed in the art include those using the Huffman coding, and table conversion methods for high speed processing.

With the table conversion method, compressible instructions of high frequencies are assigned bit lengths shorter than a predetermined instruction bit length, and the table associates the bit information of each uncompressed instruction with that of the compressed instruction. Thus, an instruction is stored in memory in a compressed form, and is executed after being decompressed to its original form referring to the table. This reduces the size of the memory required for storing the program.

With some conventional table conversion methods, instructions to be compressed are selected in view of the frequency of each set of (typically two) consecutive instructions, instead of the frequency of each individual instruction, in order to improve the instruction compression rate (e.g., see Japanese Laid-Open Patent Publication No. 2000-267848).

When a program is compressed, not all instructions are compressed. Particularly, an instruction cannot simply be compressed if it is the destination of a branch instruction. Typically, a set of two or more compressed instructions are stored in each instruction bit field in a compressed program. If an instruction being a branch destination is included in the set, it may be impossible to determine to which instruction the program should jump. Therefore, each instruction labeled as being a branch destination (hereinafter such a label will be referred to also as a "branch label) needs to be stored in the memory uncompressed even if the instruction is compressible. Thus, it is difficult to achieve a high compression rate with programs including many instructions with the branch label.

SUMMARY OF THE INVENTION

In view of the above problem, an object of the present invention is to provide an information processing system capable of producing a compressed program and executing the compressed program, in which even instructions being branch destinations can be compressed.

In order to achieve the object set forth above, the present invention provides an information processing device for executing a compressed program stored in a memory and including compressed instructions, the information processing device including: an instruction buffer for temporarily storing an m-bit signal read out from the memory; a first selector for receiving a signal from the instruction buffer and selectively outputting one of n-bit (n is smaller than m) signals obtained by dividing the received signal into n-bit length; an instruction decompression section for receiving a signal from the first selector and decompressing the received signal into the first selector into an original instruction represented by the signal; a second selector for receiving the signal from the instruction buffer and a signal from the instruction decompression section and selectively outputting the former signal when no compressed instruction is stored in the instruction buffer or the latter signal when a compressed instruction is stored in the instruction buffer; an instruction decoding section for receiving a signal from the second selector and decoding the signal and outputting a first signal that indicates presence/absence of instruction branching based on a result of the decoding; and a control section for receiving the first signal to instruct the first selector to select a predetermined one of the n-bit signals when the first signal indicates that there is instruction branching.

Thus, where the instruction decoding section determines that there is instruction branching, if a compressed instruction is stored in the instruction buffer, a predetermined one of the n-bit signals input to the first selector is selected and decompressed into an original instruction by the instruction decompression section. Then, the decompressed instruction is given to the instruction decoding section via the second selector as a branch destination instruction. Thus, branch destination instructions can be compressed and stored in a compressed program.

In one embodiment, an identifier is recorded at a predetermined position in each instruction bit field in the compressed program, the identifier indicating whether a compressed instruction is stored in the instruction bit field; the instruction buffer outputs a second signal, based on the identifier, indicating whether a compressed instruction is stored; and the second selector selects one of the two received signals based on the second signal.

In one embodiment, an identifier is added at a predetermined position in each instruction bit field in the compressed program, the identifier indicating whether a compressed instruction is stored in the instruction bit field; the instruction buffer outputs a second signal, based on the identifier, indicating whether a compressed instruction is stored; and the control section receives the second signal and instructs the second selector to select the signal from the instruction buffer when the second signal indicates that no compressed instruction is included in the instruction buffer or to select the signal from the instruction decompression section when the second signal indicates that a compressed instruction is included in the instruction buffer.

Preferably, information is added at a predetermined position in an instruction bit field in the compressed program in which a branching instruction is stored, the information indicating a storage position of a branch destination instruction corresponding to the branching instruction in an instruction bit field in which the branch destination instruction is stored; when the instruction decoding section decodes a signal representing the branching instruction, the instruction decoding section outputs, as the first signal, the destination of the branching instruction based on the added information; and the control section instructs the first selector to select one of the n-bit signals corresponding to the branch destination as indicated by the first signal.

Thus, the program can jump to an intended instruction based on the information indicating the storage position of an instruction being the destination of a branching instruction. This reduces the restriction on the compression of branch destination instructions, whereby it is possible to improve the instruction compression rate.

The present invention also provides a method for compressing instructions included in an original program to produce a compressed program, the method including the steps of: successively scanning the instructions of the original program and selecting a predetermined number of consecutive compressible instructions from the original program; determining whether a label indicating a branch destination is attached to any of the predetermined number of selected consecutive compressible instructions, excluding an $X^{th}$ (X is a predetermined integer) one of the instructions; storing a first one of the predetermined number of selected consecutive compressible instructions, in an uncompressed form, in one instruction bit field in the compressed program when it is determined that the label is attached, and compressing and storing the predetermined number of selected consecutive compressible instructions in the instruction bit field when it is determined that the label is not attached; and adding information at a predetermined position in each instruction bit field in the compressed program, the information indicating whether a compressed instruction is included in the instruction bit field.

Thus, if the destination label is not attached to a predetermined number of consecutive instructions in the original program, excluding the $X^{th}$ (X is a predetermined integer) one of the instructions, the consecutive instructions can be compressed and stored in one instruction bit field in the compressed program. Therefore, branch destination instructions can be compressed and stored in the memory. Moreover, information is added at a predetermined position in an instruction bit field in the compressed program, the information indicating whether a compressed instruction is included in the instruction bit field, whereby the information processing device executing the compressed program can easily determine whether an instruction read out from the memory is a compressed instruction.

The present invention also provides a method for compressing instructions included in an original program to produce a compressed program, the method including the steps of: successively scanning the instructions of the original program and selecting a predetermined number of consecutive compressible instructions from the original program; compressing and storing the predetermined number of selected consecutive compressible instructions in one instruction bit field in the compressed program; adding information at a predetermined position in each instruction bit field in the compressed program, the information indicating whether a compressed instruction is included in the instruction bit field; loading the compressed program to determine a storage position of each branch destination instruction in an instruction bit field in which the branch destination instruction is stored, wherein the branch destination instruction is an instruction being a destination of a branching instruction; and adding information at a predetermined position in an instruction bit field in which the branching instruction is stored, the information indicating the storage position of the corresponding branch destination instruction.

Thus, a storage position is added at a predetermined position in an instruction bit field in which a branching instruction is stored, the storage position indicating the position of the corresponding branch destination instruction in an instruction bit field in which the branch destination instruction is stored. Therefore, branch destination instructions can be compressed with no particular restrictions, thus further improving the compression rate.

DESCRIPTION OF THE PREFERRED EMBODIMENTS

Preferred embodiments of the present invention will now be described with reference to the drawings. It is understood that the present invention is not limited to the particular embodiments set forth below.

First Embodiment

Figure 1:
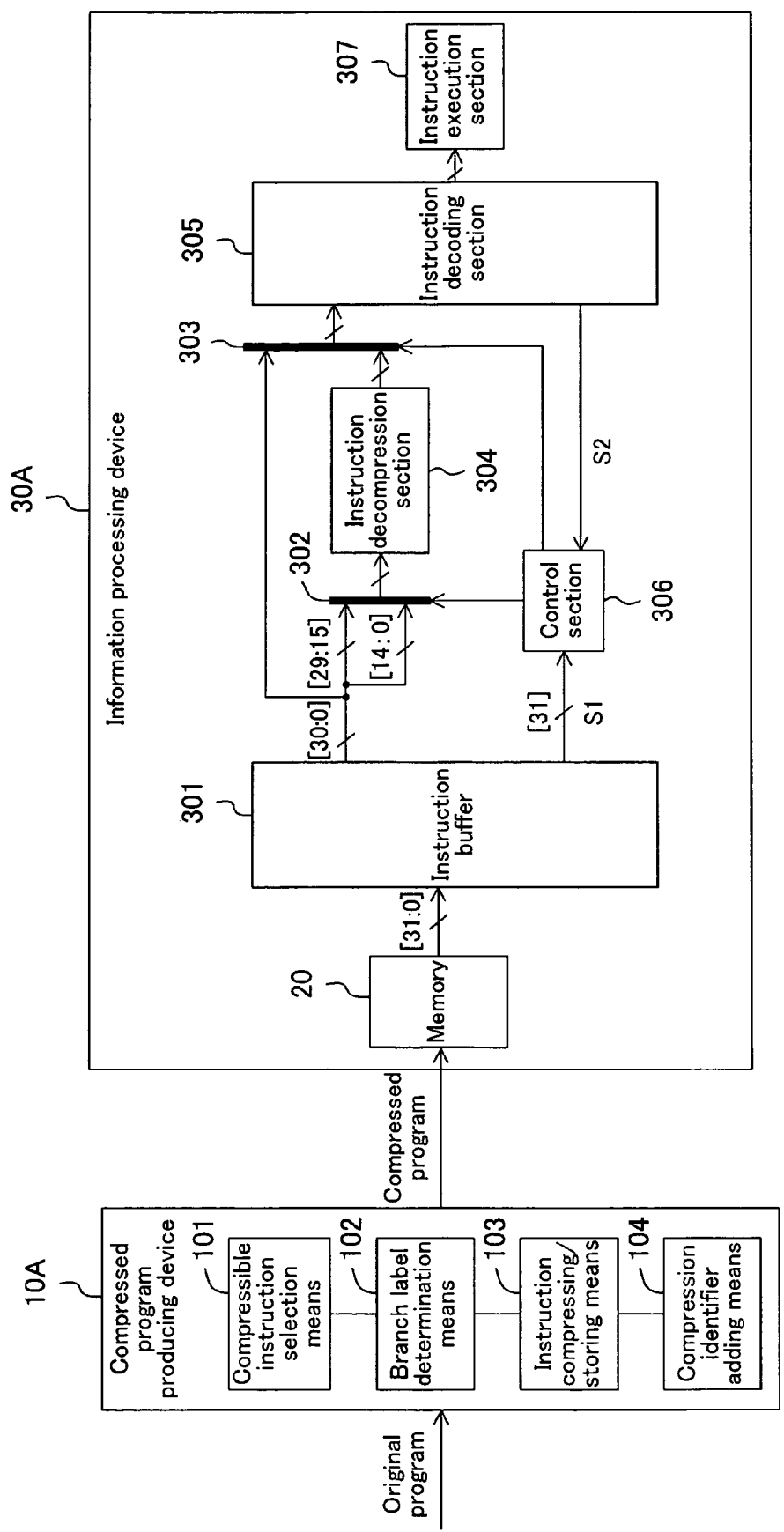
FIG. 1 shows a configuration of an information processing system according to a first embodiment of the present invention.

FIG. 1 shows a configuration of an information processing system according to a first embodiment of the present invention. The information processing system includes a compressed program producing device 10A for compressing instructions included in the original program to produce a compressed program, and an information processing device 30A for executing the compressed program.

The compressed program producing device 10A includes compressible instruction selection means 101, branch label determination means 102, instruction compressing/storing means 103, and compression identifier adding means 104. The compressible instruction selection means 101 successively scans the instructions of the received original program to select sets of instructions, each set including N (N is an integer greater than or equal to two) consecutive compressible instructions. The branch label determination means 102 determines whether the branch label is attached to the second or subsequent one of the selected N consecutive compressible instructions. If so, the instruction compressing/storing means 103 stores the first one of the selected N consecutive compressible instructions uncompressed in one instruction bit field in the compressed program. If it is determined that there is no branch label, the instruction compressing/storing means 103 compresses and stores the selected N consecutive compressible instructions in one instruction bit field in the compressed program. The compression identifier adding means 104 adds information at a predetermined position in each instruction bit field in the compressed program, the information indicating whether the instruction bit field contains a compressed instruction (hereinafter the information will be referred to also as a "compression identifier").

Figure 2:
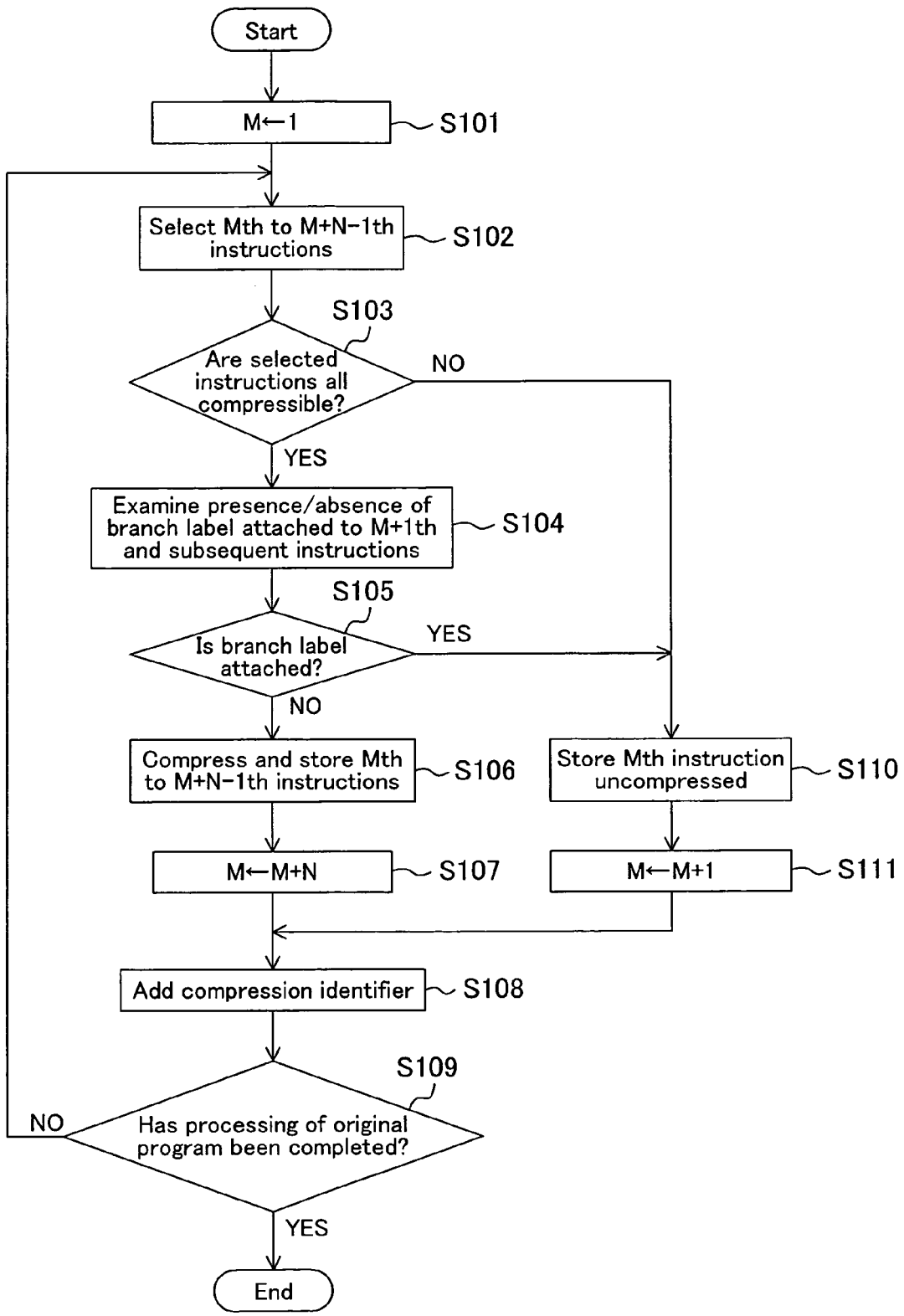
FIG. 2 shows a flow chart of a process performed by the compressed program producing device shown in FIG. 1.

Referring to the flow chart of FIG. 2, the procedure of producing a compressed program by the compressed program producing device 10A will be described. First, in step S101, M is set to 1, representing the process start position in the original program. Then, in step S102, N consecutive instructions starting from the $M^{th}$ instruction in the original program, i.e., the $M^{th}$ to $M+N-1^{th}$ instructions, are selected. Herein, N is the number of instructions that can be compressed and stored in one instruction bit field in the compressed program, and is an integer greater than or equal to two. Then, in step S103, it is determined whether the selected instructions are all compressible instructions. Specifically, it is possible to determine whether a selected instruction is a compressible instruction by determining if the instruction is contained in the association table described above. If the selected instructions are all compressible instructions, the process proceeds to step S104 to examine whether the branch label is attached to the $M+1^{th}$ or subsequent instruction. If no branch label is detected (NO in step S105), the process proceeds to step S106, where the selected N consecutive instructions are compressed and stored in one instruction bit field in the compressed program. Then, M is updated to M+N (step S107), and the process proceeds to step S108, where a compression identifier is added at a predetermined position in the instruction bit field in the compressed program, the compression identifier indicating that compressed instructions are stored in the instruction bit field. Then, in step S109, it is determined whether the processing of the original program has all been completed. If so, the compressed program producing process ends, and the process returns to step S102 otherwise.

If the set of instructions selected in step S102 includes a non-compressible instruction, the process proceeds to the NO branch of step S103 to step S110, where the $M^{th}$ instruction is stored uncompressed in one instruction bit field in the compressed program. Then, M is incremented (step S111) and the process proceeds to step S108. Then, in step S108, a compression identifier is added at a predetermined position in the instruction bit field where the $M^{th}$ instruction is stored, the compression identifier indicating that there is no compressed instruction stored in the instruction bit field.

If it is determined in the examination in step S104 that a branch label is attached to the $M+1^{th}$ or subsequent instruction (YES in step S105), the process proceeds to step S110, where the $M^{th}$ instruction is stored uncompressed in the compressed program. Thus, even if there are N consecutive compressible instructions, the instructions are not compressed in some cases. This is because the compressed program producing method assumes that if the information processing device for executing the compressed program encounters a branching instruction and if the instruction of the branch destination is compressed, the program jumps to the instruction stored in the first position in the instruction bit field, i.e., the instruction to be executed first when the compressed instructions stored in the instruction bit field are decompressed to their original form, and that the program cannot jump to the $M+1^{th}$ or subsequent instruction.

Alternatively it may be assumed that if the information processing device for executing the compressed program encounters a branching instruction, the program jumps to the $X^{th}$ (X is a predetermined integer excluding one) instruction compressed among the set of instructions in the instruction bit field in the compressed program. In this case, step S104 can be modified accordingly so as to examine whether the branch label is attached to any of the $M^{th}$ to $M+N-1^{th}$ instructions selected in step S102 excluding the $X^{th}$ instruction.

Figure 3:
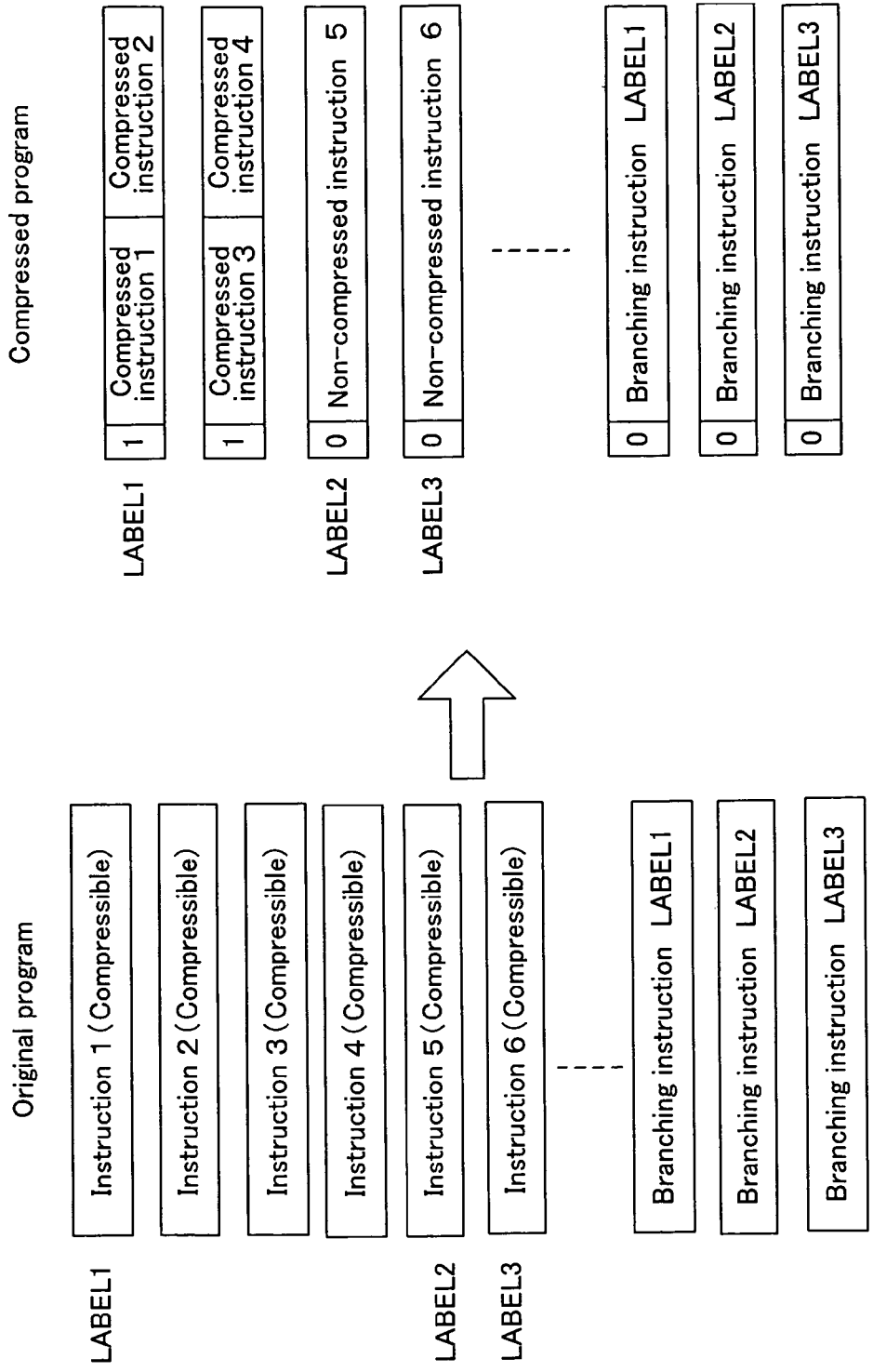
FIG. 3 shows an example of an original program, and a compressed program produced therefrom by the compressed program producing device shown in FIG. 1.

FIG. 3 shows an example of an original program, and a compressed program produced therefrom by the compressed program producing device 10A. In the illustrated example, it is assumed that sets of instructions in the original program are compressed, each set including two consecutive instructions. First, Instruction 1 and Instruction 2 in the original program are selected. These instructions are both compressible and no branch label is attached to Instruction 2. Therefore, these instructions are compressed and stored in one instruction bit field in the compressed program as Compressed instruction 1 and Compressed instruction 2, respectively. Then, the MSB of the instruction bit field in the compressed program, being the compression identifier, is set to "1", for example. The branch label LABEL1 attached to Instruction 1 in the original program is now attached to the instruction bit field containing Compressed instruction 1 therein in the compressed program. Then, Instruction 3 and Instruction 4 in the original program are selected, and are stored as Compressed instruction 3 and Compressed instruction 4, respectively, in one instruction bit field in the compressed program.

Then, Instruction 5 and Instruction 6 in the original program are selected. Although these instructions are both compressible, the branch label LABEL3 is attached to Instruction 6. Therefore, these instructions are stored uncompressed in the compressed program. Specifically, Instruction 5 and Instruction 6 are stored in different instruction bit fields in the compressed program as Non-compressed instruction 5 and Non-compressed instruction 6, respectively. The MSBs of the instruction bit fields containing Non-compressed instruction 5 and Non-compressed instruction 6 are set to "0", for example, as the compression identifier, and the branch labels LABEL2 and LABEL3 are attached to the instruction bit fields, respectively. Branching instructions in the original program are stored uncompressed in the compressed program. The offset values representing the branch destination addresses in the branching instruction (the branch labels LABEL1, LABEL2 and LABEL3 in the illustrated example) are re-calculated after the compressed program is produced.

Referring back to FIG. 1, the information processing device 30A will now be described. The information processing device 30A includes a memory 20 for storing the compressed program, an instruction buffer 301, selectors 302 and 303, an instruction decompression section 304, an instruction decoding section 305, a control section 306, and an instruction execution section 307. For the purpose of illustration, it is assumed herein that in the compressed program stored in the memory 20, a uncompressed instruction has a bit length of 31 bits, and a compressed instruction has a bit length of 15 bits, each instruction bit field contains two compressed instructions stored therein in the order they are executed starting from the upper bit side of the instruction bit field, and the compression identifier is stored in the MSB of the instruction bit field.

The instruction buffer 301 temporarily stores a 32-bit [31:0] signal read out from the memory 20. The instruction buffer 301 outputs the lower 31 bits [30:0] as an instruction-containing signal, and the MSB as a compression identifier signal S1. The selector 302 receives 15-bit signals obtained by dividing the 31-bit [30:0] signal output from the instruction buffer 301 into 15-bit length, i.e., an upper 15-bit [15:29] signal and a lower 15-bit [14:0] signal, and selectively outputs one of the received signals. The instruction decompression section 304 decompresses the signal (a compressed instruction) from the selector 302 into an original instruction. The selector 303 receives the 31-bit [30:0] signal (an uncompressed instruction) from the instruction buffer 301 and the decompressed instruction from the instruction decompression section 304, and selectively outputs one of the received instructions. The instruction decoding section 305 receives and decodes the instruction selected by the selector 303 to output a control signal. Moreover, the instruction decoding section 305 determines whether there is instruction branching based on the decoding result to output a branching identifier signal S2 indicating the presence/absence of instruction branching. The instruction execution section 307 performs a predetermined operation according to the control signal from the instruction decoding section 305.

The control section 306 receives the compression identifier signal S1 from the instruction buffer 301 and the branching identifier signal S2 from the instruction decoding section 305 to control the selections to be made by the selectors 302 and 303 based on these signals. Specifically, if the compression identifier signal S1 indicates that the instruction is not a compressed instruction, the control section 306 instructs the selector 303 to select the output from the instruction buffer 301. If the branching identifier signal S2 indicates that there is instruction branching and if the compression identifier signal S1 indicates that the instruction being the branch destination is compressed, the control section 306 instructs the selector 302 to select the upper 15-bit [29:15] signal and instructs the selector 303 to select the output from the instruction decompression section 304.

Now, the operation of the information processing device 30A, particularly the operation when executing a branching instruction, will be described by using the compressed program shown in FIG. 3 as an example. When a branching instruction branching to the branch label LABEL1 is decoded in the instruction decoding section 305, the branching identifier signal S2 indicates that there is a branching instruction, and Compressed instruction 1 and Compressed instruction 2, to which the branch label LABEL1 is attached indicating that the set of instructions is the destination of the branching instruction, are loaded to the instruction buffer 301. Then, "1" is output as the compression identifier signal S1, thus indicating that the instructions stored in the instruction buffer 301 are compressed instructions. Accordingly, the control section 306 instructs the selector 302 to select the upper 15-bit [29:15] signal, i.e., Compressed instruction 1, and the selector 303 to select the output from the instruction decompression section 304.

When a branching instruction branching to the branch label LABEL2 is decoded in the instruction decoding section 305, the branching identifier signal S2 indicates that there is a branching instruction, and Non-compressed instruction 5, to which the branch label LABEL2 is attached indicating that the instruction is the destination of the branching instruction, is loaded to the instruction buffer 301. Then, "0" is output as the compression identifier signal S1, thus indicating that the instruction stored in the instruction buffer 301 is not a compressed instruction. Accordingly, the control section 306 instructs the selector 303 to select the upper 31-bit [30:0] signal from the instruction buffer 301, i.e., Non-compressed instruction 5.

According to the present embodiment as set forth above, some of the instructions being the destinations of branching instructions can be compressed and stored in the memory, and it is possible to properly execute the compressed program in which some branch destination instructions are compressed. Thus, it is possible to improve the instruction compression rate, and to thereby reduce the size of the memory required for storing the compressed program.

Second Embodiment

Figure 4:
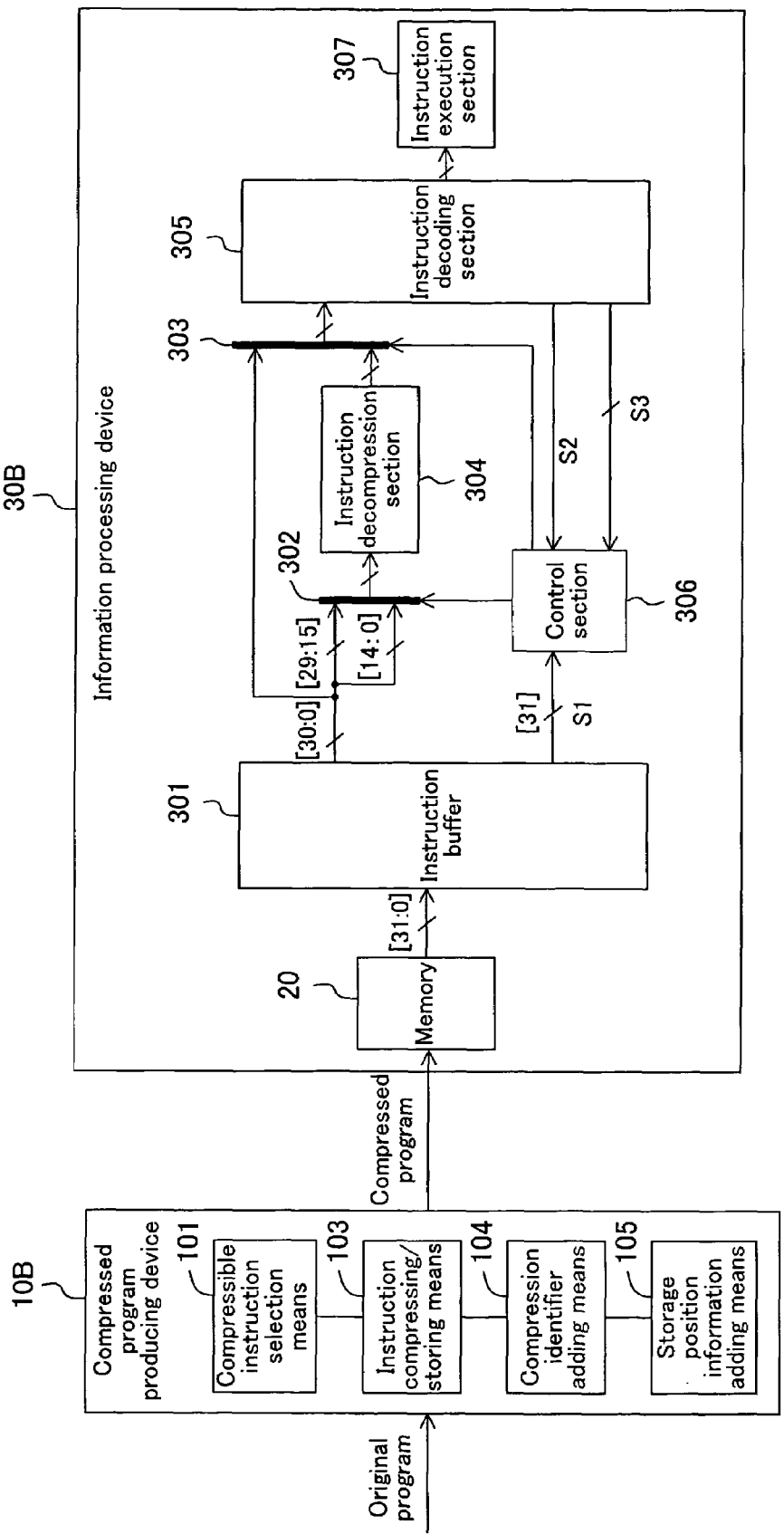
FIG. 4 shows a configuration of an information processing system according to a second embodiment of the present invention.

FIG. 4 shows a configuration of an information processing system according to a second embodiment of the present invention. The information processing system includes a compressed program producing device 10B for compressing instructions included in the original program to produce a compressed program, and an information processing device 30B for executing the compressed program. The following description of the second embodiment will focus on what is different from the first embodiment.

The compressed program producing device 10B includes the compressible instruction selection means 101, the instruction compressing/storing means 103, storage position information adding means 105, and the compression identifier adding means 104. The compressible instruction selection means 101 successively scans the instructions of the received original program to select sets of instructions, each set including N (N is an integer greater than or equal to two) consecutive compressible instructions. The instruction compressing/storing means 103 compresses and stores the selected N consecutive compressible instructions in one instruction bit field in the compressed program. The instruction compressing/storing means 103 stores each non-compressible instruction (such as a branching instruction) uncompressed in one instruction bit field in the compressed program. The compression identifier adding means 104 adds the compression identifier at a predetermined position in each instruction bit field in the compressed program. The storage position information adding means 105 successively scans the instructions of the compressed program to determine the storage position of each branch destination instruction in the instruction bit field where the branch destination instruction is stored and add information indicating the storage position (hereinafter referred to also as "storage position information") at a predetermined position in an instruction bit field in the compressed program where the corresponding branching instruction is stored.

Figure 5:
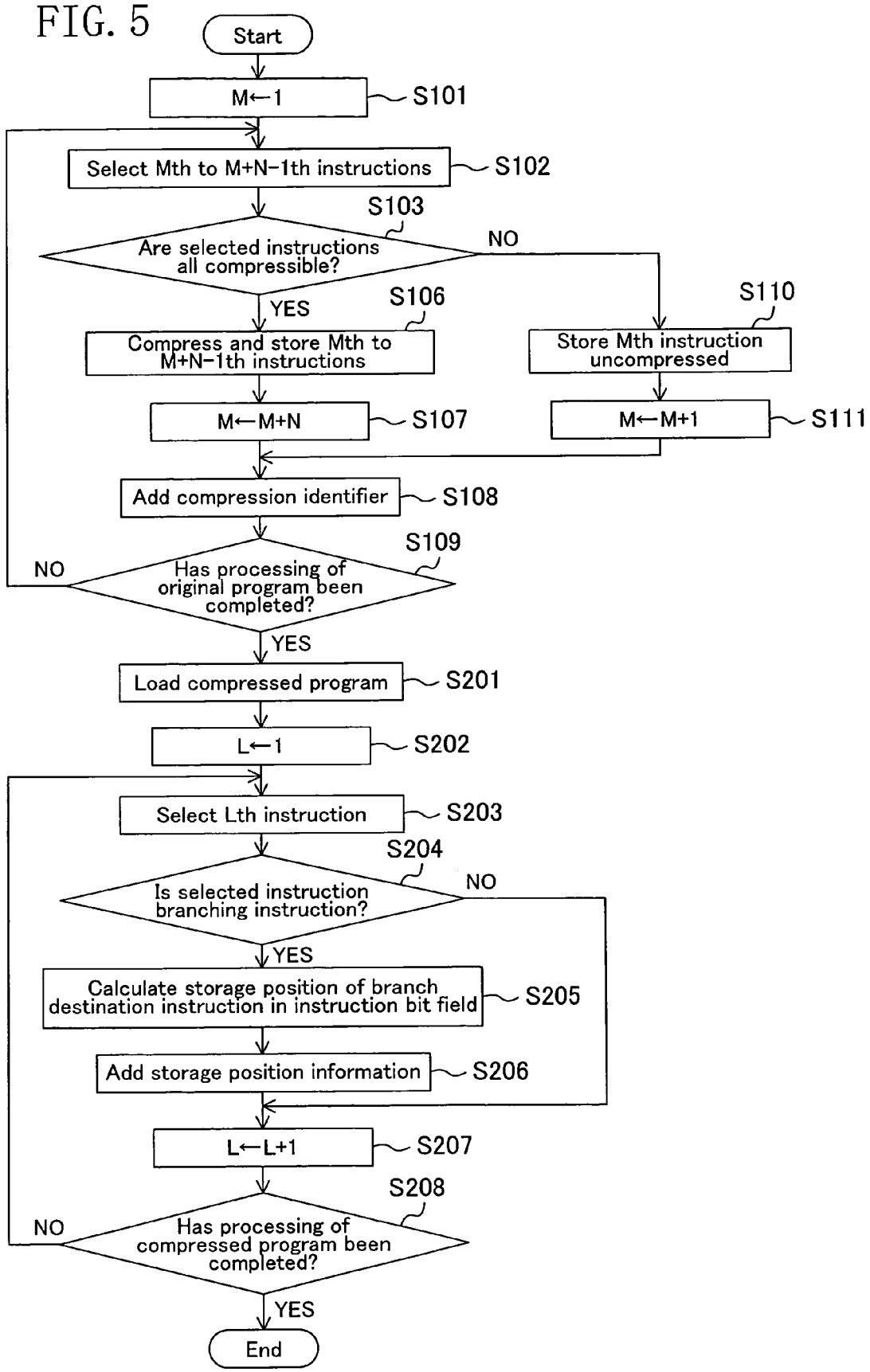
FIG. 5 shows a flow chart of a process performed by the compressed program producing device shown in FIG. 4.

Referring to the flow chart of FIG. 5, the procedure of producing a compressed program by the compressed program producing device 10B will now be described in detail. Steps S101 to S111 are performed as described above, and will not be further discussed below. After the processing of the original program is all completed in step S109, the compressed program is loaded in step S201, and L is set to 1, representing the process start position in the compressed program in step S202. Then, in step S203, the $L^{th}$ instruction in the compressed program is selected. Then, in step S204, it is determined whether the selected instruction is a branching instruction. If so, the process proceeds to step S205, where the process calculates the storage position of the corresponding branch destination instruction in the instruction bit field in which the branch destination instruction is stored. Then, in step S206, the storage position information is added at a predetermined position in the instruction bit field in which the selected branching instruction is stored. Then, L is incremented (step S207), and it is determined in step S208 whether the processing of the compressed program has all been completed. If so, the branching process of the compressed program ends, and the process returns to step S203 otherwise. If the process proceeds to the NO branch of step S204, the process jumps to step S207.

Figure 6:
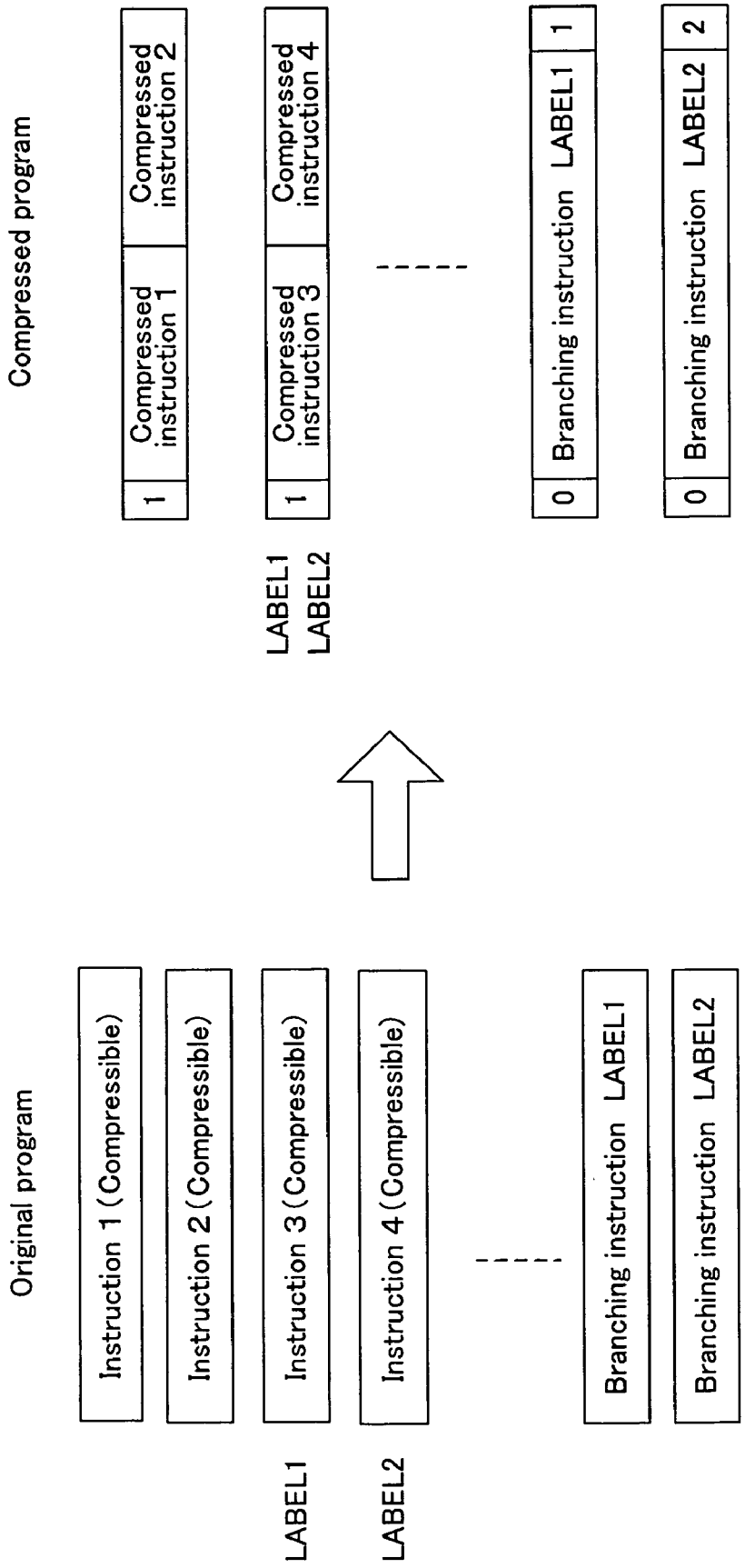
FIG. 6 shows an example of an original program, and a compressed program produced therefrom by the compressed program producing device shown in FIG. 4.

FIG. 6 shows an example of an original program, and a compressed program produced therefrom by the compressed program producing device 10B. In the illustrated example, it is assumed that sets of instructions in the original program are compressed, each set including two consecutive instructions. First, Instruction 1 and Instruction 2 in the original program are selected. These instructions are both compressible. Therefore, these instructions are compressed and stored in one instruction bit field in the compressed program as Compressed instruction 1 and Compressed instruction 2, respectively. Then, the MSB of the instruction bit field in the compressed program, being the compression identifier, is set to "1", for example. Then, Instruction 3 and Instruction 4 in the original program are selected, and are stored as Compressed instruction 3 and Compressed instruction 4, respectively, in one instruction bit field in the compressed program, since these instructions are both compressible instructions. Since the branch labels LABEL1 and LABEL2 are attached to Instruction 3 and Instruction 4, respectively, in the original program, the branch labels LABEL1 and LABEL2 are attached to the instruction bit field in the compressed program in which Compressed instruction 3 and Compressed instruction 4 are stored.

Branching instructions in the original program, being non-compressible instructions, are stored uncompressed in the compressed program. Since Instruction 3 in the original program corresponding to the branch label LABEL1 is compressed in the compressed program, the storage position of Compressed instruction 3 in the instruction bit field in the compressed program is calculated. Since Compressed instruction 3 is located at the beginning of the instruction bit field, the storage position thereof is "1". Therefore, the branching instruction in the original program branching to the branch label LABEL1 is given "1", for example, as the storage position information in the compressed program. Similarly, the branching instruction in the original program branching to the branch label LABEL2 is given "2", for example, as the storage position information in the compressed program. The offset values representing the branch destination addresses in the branching instruction (the branch labels LABEL1 and LABEL2 in the illustrated example) are re-calculated after the compressed program is produced.

Referring back to FIG. 4, the information processing device 30B will now be described. The information processing device 30B basically has the same configuration as that of the information processing device 30A shown in FIG. 1. In addition to the branching identifier signal S2, the instruction decoding section 305 outputs a storage position signal S3 as the storage position information. If the branching identifier signal S2 indicates that there is instruction branching and the compression identifier signal S1 indicates that the branch destination instruction is compressed, the control section 306 instructs the selector 302 to select one of the two input signals as indicated by the storage position signal S3.

Now, the operation of the information processing device 30B, particularly the operation when executing a branching instruction, will be described by using the compressed program shown in FIG. 6 as an example. When a branching instruction branching to Compressed instruction 3 is decoded in the instruction decoding section 305, the branching identifier signal S2 indicates that there is a branching instruction with the storage position signal S3 indicating the storage position of the branch destination instruction, and Compressed instruction 3 and Compressed instruction 4, to which the branch label LABEL1 being the branch destination is attached, are loaded to the instruction buffer 301. Then, "1" is output as the compression identifier signal S1, thus indicating that the instructions stored in the instruction buffer 301 are compressed instructions. Moreover, the storage position signal S3 indicates that the storage position of the branch destination instruction is "1". Accordingly, the control section 306 instructs the selector 302 to select the upper 15-bit [29:15] signal, i.e., Compressed instruction 3, and the selector 303 to select the output from the instruction decompression section 304.

When a branching instruction branching to Compressed instruction 4 is decoded in the instruction decoding section 305, the branching identifier signal S2 indicates that there is a branching instruction with the storage position signal S3 indicating the storage position of the branch destination instruction, and Compressed instruction 3 and Compressed instruction 4, to which the branch label LABEL2 being the branch destination is attached, are loaded to the instruction buffer 301. Then, "1" is output as the compression identifier signal S1, thus indicating that the instructions stored in the instruction buffer 301 are compressed instructions. Moreover, the storage position signal S3 indicates that the storage position of the branch destination instruction is "2". Accordingly, the control section 306 instructs the selector 302 to select the lower 15-bit [14:0] signal, i.e., Compressed instruction 4, and the selector 303 to select the output from the instruction decompression section 304.

The present embodiment achieves a higher instruction compression rate than the first embodiment, whereby it is possible to significantly reduce the size of the memory required for storing the compressed program.

In the embodiments set forth above, the compression identifier may not be output, as it is, as the compression identifier signal S1. Specifically, the compression identifier does not have to be the MSB of an instruction bit field in the compressed program, and does not have to be 1-bit long. A special bit string may be used as the compression identifier, e.g., the upper four bits [31:28] of the instruction bit field in the compressed program, wherein when the upper four bits are all "1", the compression identifier signal S1 is set to a predetermined value indicating that compressed instructions are stored in the instruction buffer 301. Then, if it is ensured that the upper four bits of a compressed instruction are not all "1", the bit length of a compressed instruction may be 16 bits.

In the embodiments set forth above, the selector 303 may be controlled directly by the compression identifier signal S1. Specifically, the selector 303 may select the output from the instruction decompression section 304 when the compression identifier signal S1 indicates that compressed instructions are stored in the instruction buffer 301, while selecting the output from the instruction buffer 301 when the compression identifier signal S1 indicates that no compressed instruction is stored in the instruction buffer 301.

The information processing system of the present invention can achieve a high program compression rate, thereby reducing the size of the memory required for storing the compressed program, and is particularly useful for devices with built-in processors that are controlled by large-scale original programs.

What is claimed is:

1. An information processing device for executing a compressed program stored in a memory and including compressed instructions, the information processing device comprising:

an instruction buffer for temporarily storing an m-bit signal read out from the memory;

a first selector for receiving a signal from the instruction buffer and selectively outputting one of n-bit (n is smaller than m) signals obtained by dividing the received signal into n-bit length;

an instruction decompression section for receiving a signal from the first selector and decompressing the received signal into an original instruction represented by the signal;

a second selector for receiving the signal from the instruction buffer and a signal from the instruction decompression section and selectively outputting the former signal when no compressed instruction is stored in the instruction buffer or the latter signal when a compressed instruction is stored in the instruction buffer;

an instruction decoding section for receiving a signal from the second selector and decoding the signal and outputting a first signal that indicates presence/absence of instruction branching based on a result of the decoding; and a control section for receiving the first signal to instruct the first selector to select a predetermined one of the n-bit signals when the first signal indicates that there is instruction branching.

2. The information processing device of claim 1, wherein:

an identifier is recorded at a predetermined position in each instruction bit field in the compressed program, the identifier indicating whether a compressed instruction is stored in the instruction bit field;

the instruction buffer outputs a second signal, based on the identifier, indicating whether a compressed instruction is stored; and the second selector selects one of the two received signals based on the second signal.

3. The information processing device of claim 1, wherein:

an identifier is added at a predetermined position in each instruction bit field in the compressed program, the identifier indicating whether a compressed instruction is stored in the instruction bit field;

the instruction buffer outputs a second signal, based on the identifier, indicating whether a compressed instruction is stored; and the control section receives the second signal and instructs the second selector to select the signal from the instruction buffer when the second signal indicates that no compressed instruction is included in the instruction buffer or to select the signal from the instruction decompression section when the second signal indicates that a compressed instruction is included in the instruction buffer.

4. The information processing device of claim 1, wherein:

information is added at a predetermined position in an instruction bit field in the compressed program in which a branching instruction is stored, the information indicating a storage position of a branch destination instruction corresponding to the branching instruction in an instruction bit field in which the branch destination instruction is stored;

when the instruction decoding section decodes a signal representing the branching instruction, the instruction decoding section outputs, as the first signal, the destination of the branching instruction based on the added information; and the control section instructs the first selector to select one of the n-bit signals corresponding to the branch destination as indicated by the first signal.

5. A method for compressing instructions included in an original program to produce a compressed program, the method comprising the steps of:

successively scanning the instructions of the original program and selecting a predetermined number of consecutive compressible instructions from the original program;

determining whether a label indicating a branch destination is attached to any of the predetermined number of selected consecutive compressible instructions, excluding an $X^{th}$ (X is a predetermined integer) one of the instructions;

storing a first one of the predetermined number of selected consecutive compressible instructions, in an uncompressed form, in one instruction bit field in the compressed program when it is determined that the label is attached, and compressing and storing the predetermined number of selected consecutive compressible instructions in the instruction bit field when it is determined that the label is not attached; and adding information at a predetermined position in each instruction bit field in the compressed program, the information indicating whether a compressed instruction is included in the instruction bit field.

6. A method for compressing instructions included in an original program to produce a compressed program, the method comprising the steps of:

successively scanning the instructions of the original program and selecting a predetermined number of consecutive compressible instructions from the original program;

compressing and storing the predetermined number of selected consecutive compressible instructions in one instruction bit field in the compressed program;

adding information at a predetermined position in each instruction bit field in the compressed program, the information indicating whether a compressed instruction is included in the instruction bit field;

loading the compressed program to determine a storage position of each branch destination instruction in an instruction bit field in which the branch destination instruction is stored, wherein the branch destination instruction is an instruction being a destination of a branching instruction; and adding information at a predetermined position in an instruction bit field in which the branching instruction is stored, the information indicating the storage position of the corresponding branch destination instruction.

7. An information processing system, comprising:

a compressed program producing device for carrying out the compressed program producing method of claim 5; and the information processing device of claim 1.

8. An information processing system, comprising:

a compressed program producing device for carrying out the compressed program producing method of claim 6; and the information processing device of claim 4.

* * * * *